(12) United States Patent
Birnkrant et al.

(10) Patent No.: US 11,443,604 B2
(45) Date of Patent: Sep. 13, 2022

(54) EXPLOSION PROOF FIBER OPTIC BASED DETECTION

(71) Applicant: Carrier Corporation, Palm Beach Gardens, FL (US)

(72) Inventors: Michael J. Birnkrant, Wethersfield, CT (US); Hector Ortiz Valencia, Barcelona (ES); Marcin Piech, East Hampton, CT (US); Michael T. Gorski, Clinton, CT (US); Peter R. Harris, West Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/057,003

(22) PCT Filed: Jul. 2, 2019

(86) PCT No.: PCT/US2019/040318
§ 371 (c)(1),
(2) Date: Nov. 19, 2020

(87) PCT Pub. No.: WO2020/014042
PCT Pub. Date: Jan. 16, 2020

(65) Prior Publication Data
US 2021/0241594 A1 Aug. 5, 2021

Related U.S. Application Data

(60) Provisional application No. 62/697,544, filed on Jul. 13, 2018.

(51) Int. Cl.
*G08B 17/10* (2006.01)
*G08B 17/107* (2006.01)
(Continued)

(52) U.S. Cl.
CPC .......... *G08B 17/107* (2013.01); *G01N 21/53* (2013.01); *G08B 25/12* (2013.01); *G08B 26/006* (2013.01)

(58) Field of Classification Search
CPC .................................................. G08B 17/107
See application file for complete search history.

(56) References Cited

U.S. PATENT DOCUMENTS 2,726,381 A 12/1955 Verkuil et al.
4,267,549 A 5/1981 Taylor
(Continued)

FOREIGN PATENT DOCUMENTS

DE 102013213721 A1 5/2014
KR 20130027772 A * 3/2013
(Continued)

OTHER PUBLICATIONS

International Search Report of the International Searching Authority; International Application No. PCT/US2019/040318; International Filing Date: Jul. 2, 2019; dated Oct. 18, 2019; 21 pages.
(Continued)

*Primary Examiner* — Travis R Hunnings
(74) *Attorney, Agent, or Firm* — Cantor Colburn LLP

(57) ABSTRACT

A system for measuring a status of a detection device having a component transformable between a plurality of configurations includes a fiber optic cable for transmitting light. The at least one fiber optic cable defines a node arranged in communication with the component. A control system is operably coupled to the fiber optic cable such that scattered light reflected from the component and returned to the node is transmitted to the control system. The control system analyzes the scattered light to determine the configuration of the component.

18 Claims, 12 Drawing Sheets

(51) Int. Cl.
    *G01N 21/53*     (2006.01)
    *G08B 25/12*     (2006.01)
    *G08B 26/00*     (2006.01)

(56) References Cited

U.S. PATENT DOCUMENTS

| | | |
|---|---|---|
| 4,280,120 A | 7/1981 | Trafford et al. |
| 4,359,719 A | 11/1982 | Schwarzer |
| 4,551,707 A | 11/1985 | Simpson |
| 4,706,065 A | 11/1987 | Kovacic et al. |
| 5,471,197 A | 11/1995 | McCurdy et al. |
| 7,408,477 B2 | 8/2008 | Finkle et al. |
| 8,026,825 B2 | 9/2011 | Santos |
| 8,432,266 B2 | 4/2013 | Varieur |
| 9,454,891 B2 | 9/2016 | Lyman et al. |
| 2008/0210443 A1* | 9/2008 | Erva .................. G08B 25/12 169/46 |
| 2017/0197102 A1 | 7/2017 | Sandahl et al. |

FOREIGN PATENT DOCUMENTS

| | | |
|---|---|---|
| KR | 20130027772 A | 3/2013 |
| WO | 9744765 A1 | 11/1997 |
| WO | 2017011261 A1 | 1/2017 |

OTHER PUBLICATIONS

Written Opinion of the International Searching Authority; International Application No. PCT/US2019/040318 International Filing Date: Jul. 2, 2019; dated Oct. 18, 2019; 10 pages.

\* cited by examiner

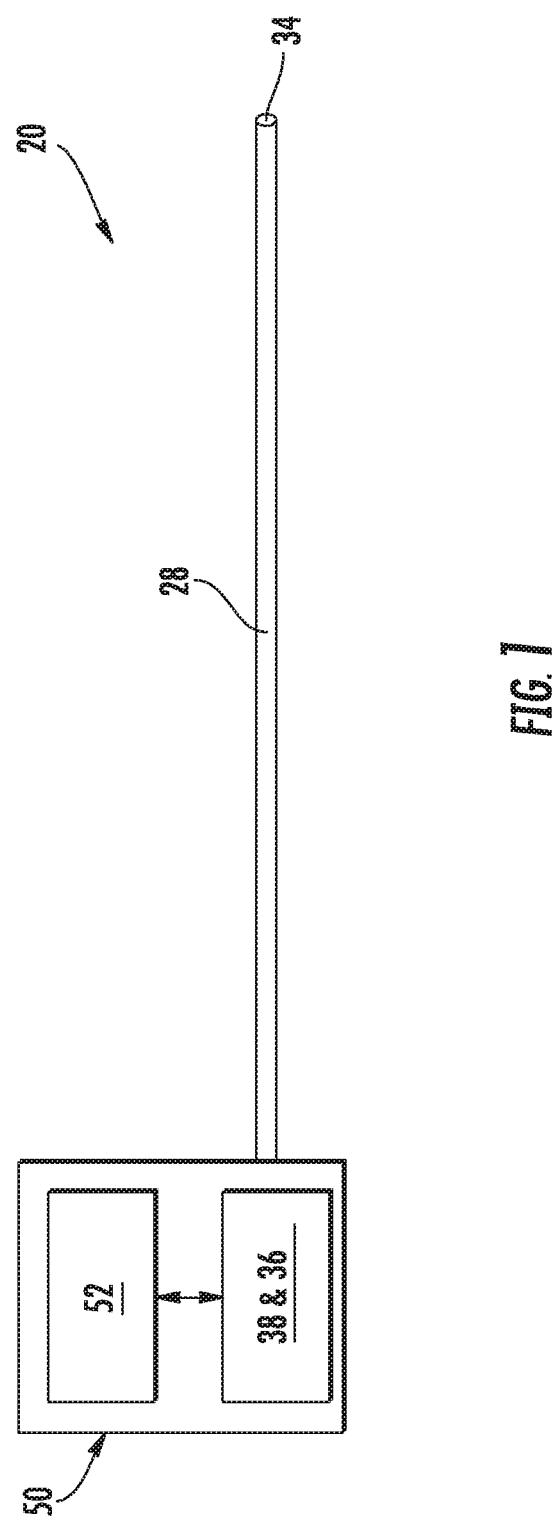

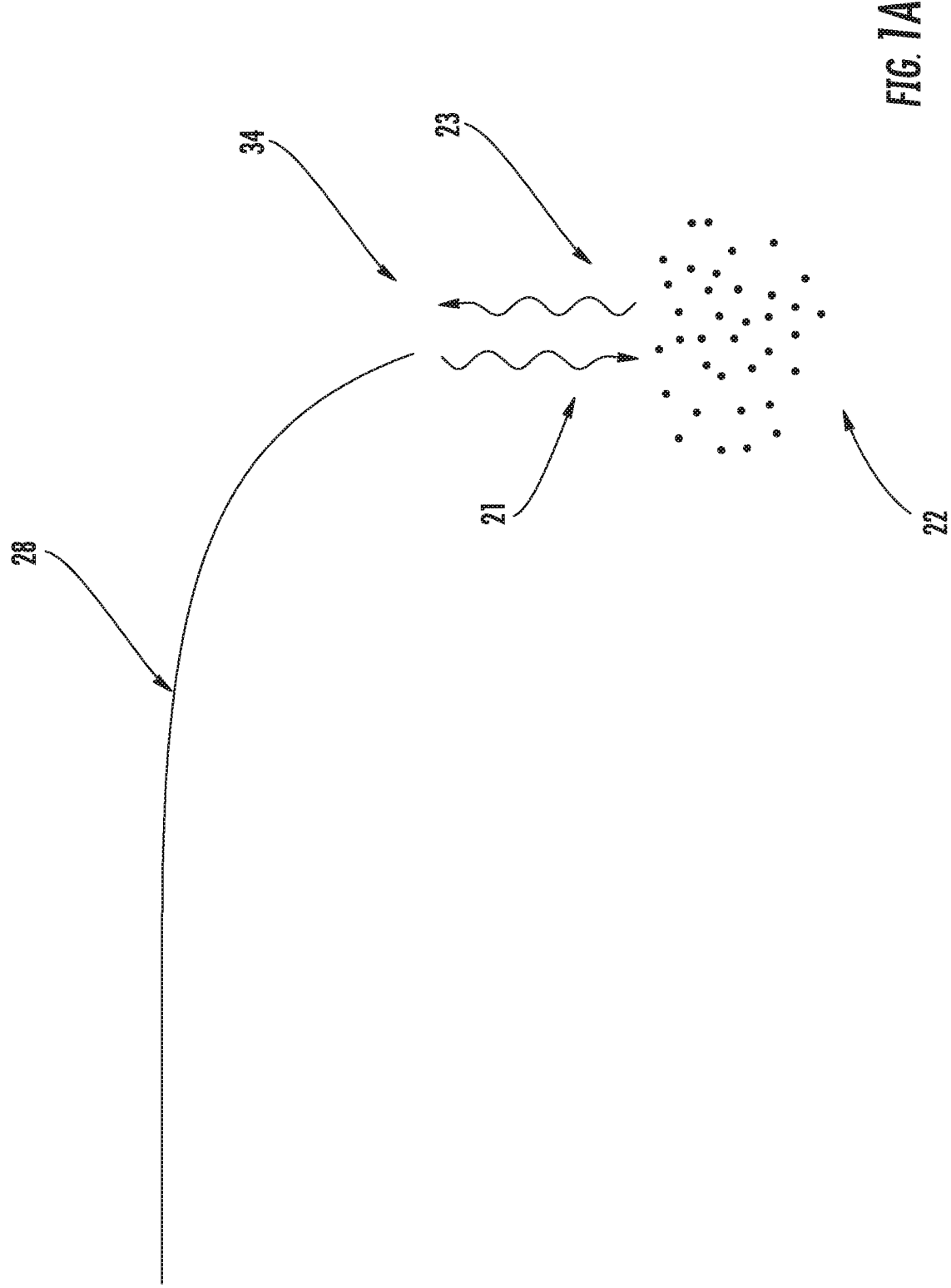

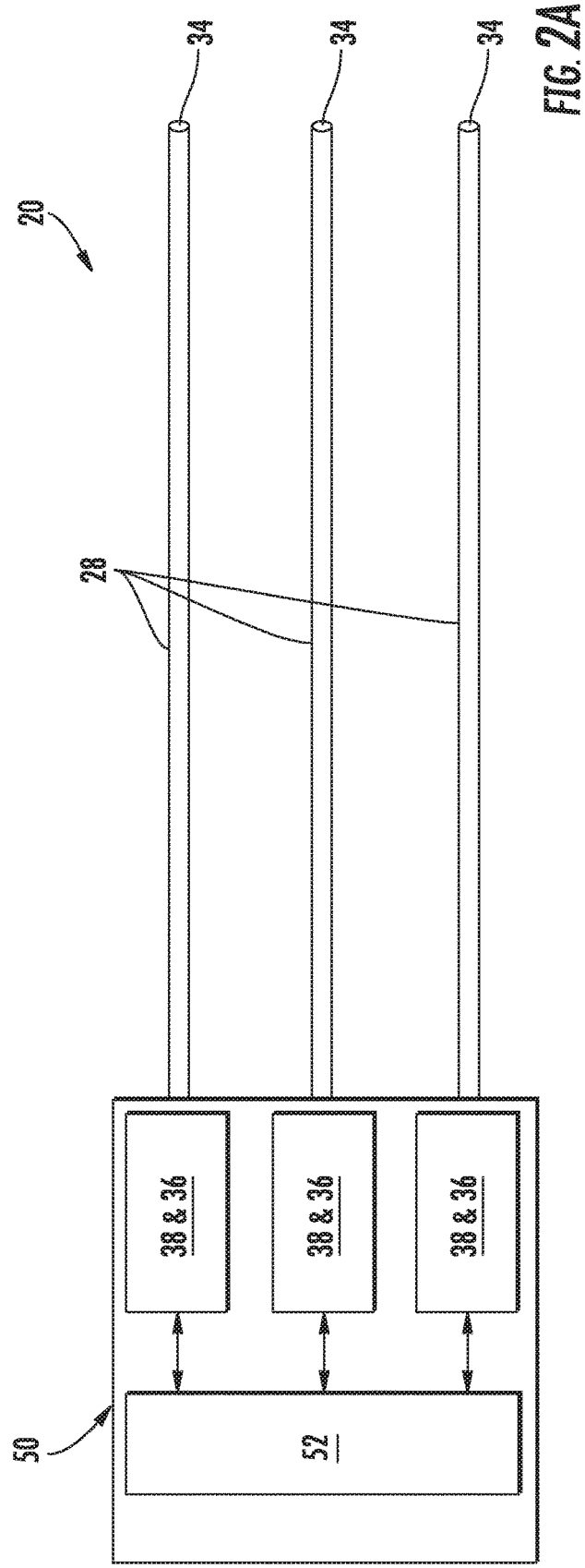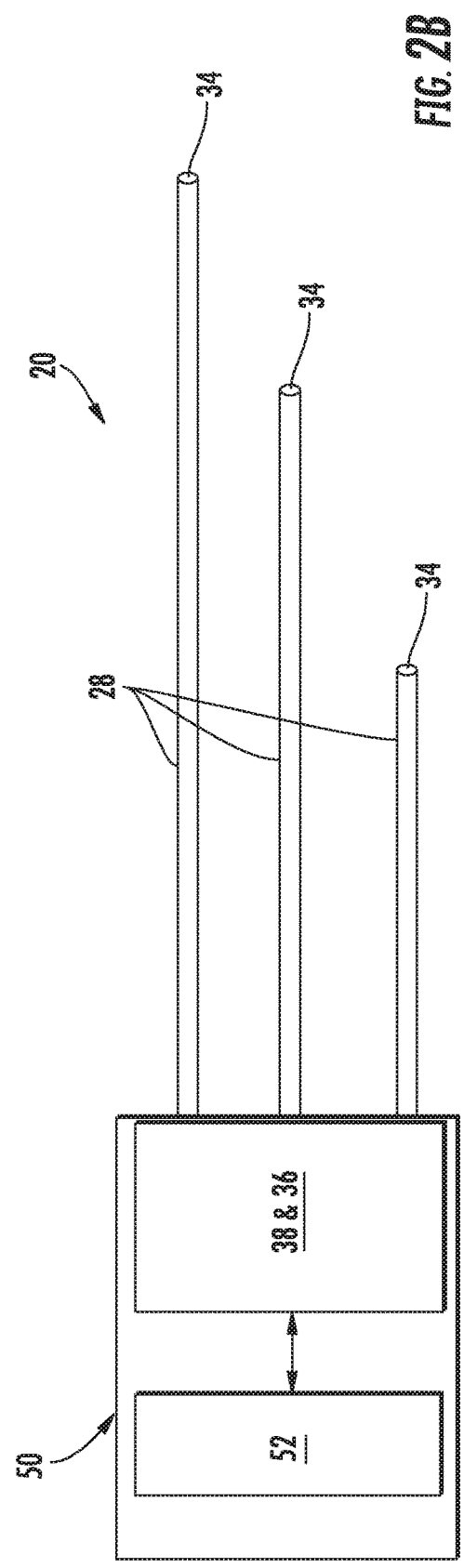

EXPLOSION PROOF FIBER OPTIC BASED DETECTION

CROSS REFERENCE TO RELATED APPLICATIONS

This application is a National Stage application of PCT/US2019/040318 filed Jul. 2, 2019, which claims priority to U.S. Provisional application 62/697,544 filed Jul. 13, 2018, both of which are incorporated by reference in their entirety herein.

BACKGROUND

Embodiments of this disclosure relate generally to a system for detecting conditions of a device and, more particularly, to a fiber optic detection system.

Existing fire detection alarm systems typically include manually operated pull-stations (also called manual call-points) and automatic sensor devices that are placed throughout the building and connected to a wiring system that communicates the activation of the automated sensors and pull-stations to circuitry in a control panel. The manually operated pull-stations and automated sensor devices work in conjunction with one another to send a signal to the control panel indicating that a specified emergency (i.e. fire) exists. In response, the system will alert the building occupants so that appropriate action may be taken.

SUMMARY

According to a first embodiment, a system for measuring a status of a detection device having a component transformable between a plurality of configurations includes a fiber optic cable for transmitting light. The at least one fiber optic cable defines a node arranged in communication with the component. A control system is operably coupled to the fiber optic cable such that scattered light reflected from the component and returned to the node is transmitted to the control system. The control system analyzes the scattered light to determine the configuration of the component.

In addition to one or more of the features described above, or as an alternative, in further embodiments the component is manually transformable between the plurality of configurations.

In addition to one or more of the features described above, or as an alternative, in further embodiments the component is automatically transformable between the plurality of configurations in response to an external condition.

In addition to one or more of the features described above, or as an alternative, in further embodiments the node is arranged in communication with a chamber formed at an interior of the detection device.

In addition to one or more of the features described above, or as an alternative, in further embodiments the plurality of configurations comprise at least a first configuration and a second configuration, the component being in the first configuration during normal operation of the detection device and the component being in the second configuration when the detection device is activated.

In addition to one or more of the features described above, or as an alternative, in further embodiments the detection device is a pull station.

In addition to one or more of the features described above, or as an alternative, in further embodiments the component of the detection device is an alarm activation mechanism.

In addition to one or more of the features described above, or as an alternative, in further embodiments a geometry of the alarm activation mechanism in the first configuration is distinct from a geometry of the alarm activation mechanism in the second configuration.

In addition to one or more of the features described above, or as an alternative, in further embodiments the detection device comprises a heat responsive mechanism.

In addition to one or more of the features described above, or as an alternative, in further embodiments wherein the heat responsive mechanism is a sprinkler.

In addition to one or more of the features described above, or as an alternative, in further embodiments the component of the heat responsive mechanism is an activator bulb.

In addition to one or more of the features described above, or as an alternative, in further embodiments the activator bulb is whole in the first configuration and is broken in the second configuration.

In addition to one or more of the features described above, or as an alternative, in further embodiments a fluid contained within the activator bulb is in a first state in the first configuration and is in a second state in the second configuration.

In addition to one or more of the features described above, or as an alternative, in further embodiments in the first state the fluid is a liquid, and in the second state the fluid is a bubbling or at least partially vaporized.

According to another embodiment, a method for determining a status of a detection device includes transmitting light along a fiber optic cable to a node arranged in communication with a component of the detection device, receiving scattered light reflected from the component, communicating the scattered light to a control system, and analyzing the scattered light to determine a configuration of the component.

In addition to one or more of the features described above, or as an alternative, in further embodiments the detection component is transformable between a first configuration and a second configuration and analyzing the scattered light determined whether the component is in the first configuration or the second configuration.

In addition to one or more of the features described above, or as an alternative, in further embodiments comprising determining a status of the detection device in response to the configuration of the component.

In addition to one or more of the features described above, or as an alternative, in further embodiments transmitting light along a fiber optic cable to a node arranged in communication with a component of the detection device comprises transmitting light into a chamber of the detection device within which the component is at least partially received.

In addition to one or more of the features described above, or as an alternative, in further embodiments transmitting light along a fiber optic cable to a node arranged in communication with a component of the detection device.

In addition to one or more of the features described above, or as an alternative, in further embodiments comprising converting the scattered light into a binary signal before communicating the electronic signal to a control unit of the control system.

According to yet another embodiment, a detection system associated with a building includes at least one detection device and a fiber harness comprising at least one fiber optic cable. The fiber harness has a plurality of nodes, each of the plurality of nodes being associated with one of ambient atmosphere and the at least one detection device. A control system is operably coupled to the fiber harness such that scattered light associated with the plurality of nodes is transmitted to the control system. The control system is operable to determine a condition associated with the ambient atmosphere at the nodes and determine a status for the at least one detection device.

In addition to one or more of the features described above, or as an alternative, in further embodiments the control system is further operable to determine the presence of smoke at the plurality of nodes associated with the ambient atmosphere.

In addition to one or more of the features described above, or as an alternative, in further embodiments the at least one detection device is an electrically powered detection device.

In addition to one or more of the features described above, or as an alternative, in further embodiments comprising an energy conversion device arranged in communication with at least one of the plurality of nodes associated with the electrically powered detection device.

In addition to one or more of the features described above, or as an alternative, in further embodiments the energy conversion device is a photovoltaic cell.

In addition to one or more of the features described above, or as an alternative, in further embodiments the at least one detection device comprises a sensor, radio, camera, indicator, transmitter, and receiver.

In addition to one or more of the features described above, or as an alternative, in further embodiments at least one detection device is a pull station.

In addition to one or more of the features described above, or as an alternative, in further embodiments at least one detection device comprises a heat responsive mechanism.

In addition to one or more of the features described above, or as an alternative, in further embodiments the detection system is a fire protection system.

In addition to one or more of the features described above, or as an alternative, in further embodiments the control system is operable to analyze the scattered light reflected from at least one of the plurality of nodes, communicate with the at least one of the plurality of nodes, and deliver power to the at least one detection device.

In addition to one or more of the features described above, or as an alternative, in further embodiments the control system further comprises at least one light source operably coupled to each of the plurality of nodes.

In addition to one or more of the features described above, or as an alternative, in further embodiments the control system further comprises at least one light sensitive device operably coupled to each of the plurality of nodes.

According to yet another embodiment, a method of managing a building includes transmitting light along a fiber optic cable to a first node associated with an ambient atmosphere within the building, receiving at the first node scattered light associated with the ambient atmosphere, communicating the scattered light associated with the ambient atmosphere to a control system, analyzing the scattered light associated with the ambient atmosphere to determine an existence of a condition at the first node, transmitting light along the fiber optic cable to a second node associated with a detection device arranged within the building, receiving scattered light associated with the detection device at the second node, communicating the scattered light associated with the detection device to a control system, and analyzing the scattered light associated with the detection device to determine a configuration of the detection device at the second node.

In addition to one or more of the features described above, or as an alternative, in further embodiments transmitting light to the first node and transmitting light to the second node occurs simultaneously.

In addition to one or more of the features described above, or as an alternative, in further embodiments the detection device is a component of a fire detection system.

In addition to one or more of the features described above, or as an alternative, in further embodiments the detection device is a pull station.

In addition to one or more of the features described above, or as an alternative, in further embodiments the detection device is a heat responsive mechanism.

In addition to one or more of the features described above, or as an alternative, in further embodiments the detection device is electrically powered.

In addition to one or more of the features described above, or as an alternative, in further embodiments comprising transmitting light along the fiber optic cable to a third node located adjacent the second node, converting the light emitted from the third node into electrical energy, and providing the electrical energy to the electrically powered detection device at the second node.

In addition to one or more of the features described above, or as an alternative, in further embodiments comprising transmitting light along the fiber optic cable to a third node, converting the light emitted from the third node into electrical energy, and providing the electrical energy to an electrically powered device located at the third node.

BRIEF DESCRIPTION OF THE DRAWINGS

The subject matter, which is regarded as the present disclosure, is particularly pointed out and distinctly claimed in the claims at the conclusion of the specification. The foregoing and other features, and advantages of the present disclosure are apparent from the following detailed description taken in conjunction with the accompanying drawings in which:

FIG. 1 is schematic diagram of a detection system according to an embodiment;

FIG. 1A is a schematic diagram of light transmission at a node of a detection system according to an embodiment;

FIG. 2A is a schematic diagram of a detection system according to another embodiment;

FIG. 2B is a schematic diagram of a detection system according to another embodiment;

Figure 3:
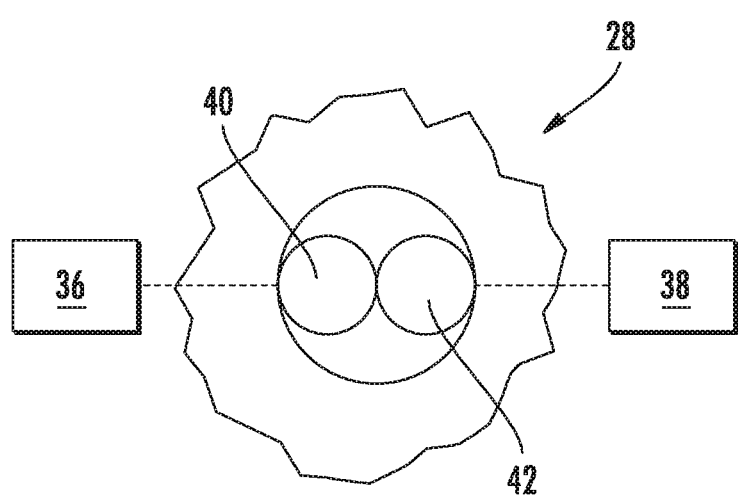
FIG. 3 is a cross-sectional view of a fiber optic node of the fiber harness of FIG. 1 according to an embodiment.

The detailed description explains embodiments of the present disclosure, together with advantages and features, by way of example with reference to the drawings.

DETAILED DESCRIPTION

Referring now to the FIGS., a detection system 20, such as for use with one or more devices of a monitoring and alarm system for example, is illustrated. In an embodiment, the detection system 20 uses light to evaluate a volume to determine a condition or status of a corresponding device. As used herein, the term "light" means coherent or incoherent radiation at any frequency or a combination of frequencies in the electromagnetic spectrum. In an example, the photoelectric system uses light scattering to determine the presence of particles in the ambient atmosphere to indicate the existence of a predetermined condition or event. In this specification, the term "scattered light" may include any change to the amplitude/intensity or direction of the incident light, including reflection, refraction, diffraction, absorption, and scattering in any/all directions. In this example, light is emitted into the designated area; when the light encounters an object, the light can be scattered and/or absorbed due to a difference in the refractive index of the object compared to the surrounding medium (air). Depending on the object, the light can be scattered in all different directions. Observing any changes in the incident light, by detecting light scattered by an object for example, can provide information about the designated area including determining a status or condition of a device within the designated area.

In its most basic form, as shown in FIG. 1, the detection system 20 includes a single fiber optic cable 28 with at least one fiber optic core. The term fiber optic cable 28 includes any form of optical fiber. As examples, an optical fiber is a length of cable that is composed of one or more optical fiber cores of single-mode, multimode, polarization maintaining, photonic crystal fiber or hollow core. Each cable may have a length of up to 5000 m. A node 34 is located at the termination point of a fiber optic cable 28 and is inherently included in the definition of a fiber optic cable 28. The node 34 is positioned in communication with the ambient atmosphere.

A light source 36, such as a laser diode for example, and a light sensitive device 38, such as a photodiode for example, are coupled to the fiber optic cable 28. A control system 50 of the detection system 20 including a control unit 52, discussed in further detail below, is utilized to manage the detection system operation and may include control of components, data acquisition, data processing and data analysis.

As shown in FIG. 1A, the light from the light source 36 is transmitted through fiber optic cable 28 and through the node 34 to the surrounding area, illustrated schematically at 21. The light 21 interacts with one or more particles indicative of a condition, illustrated schematically at 22, and is reflected or transmitted back to the node 34, illustrated schematically at 23. A comparison of the light provided to the node 34 from the light source 36 and/or changes to the light reflected back to the light sensitive device 38 from the node 34 will indicate whether or not changes in the atmosphere, such as particles 22 for example, are present in the ambient atmosphere adjacent the node 34 that are causing the scattering of the light. The scattered light as described herein is intended to additionally include reflected, transmitted, and absorbed light. Although the detection system 20 is described as using light scattering to determine a condition or event, embodiments where light obscuration, absorption, and fluorescence is used in addition to or in place of light scattering are also within the scope of the disclosure.

In another embodiment, the detection system 20 can include a plurality of nodes 34. For example, as illustrated in FIG. 2A, a plurality of fiber optic cables 28 and corresponding nodes 34 are each associated with a distinct light sensitive device 38. In embodiments where an individual light sensitive device 38 is associated with each node 34, as shown in FIG. 2A, the signal output from each node 34 can be monitored. Upon detection of a predetermined event or condition, it will be possible to localize the position of the event because the position of each node 34 within the system 20 is known. Alternately, as shown in FIG. 2B, a plurality of fiber optic cables 28, may be coupled to a single light source 36 and/or light sensitive device 38.

In embodiments where a single light sensitive device 38 is configured to receive scattered light from a plurality of nodes 34, the control system 50 is able to localize the scattered light, i.e. identify the scattered light received from each of the plurality of nodes 34. For example, the control system 50 may use the position of each node 34, specifically the length of the fiber optic cables 28 associated with each node 34 and the corresponding time of flight (i.e. the time elapsed between when the light was emitted by the light source 36 and when the scattered light was received by the light sensitive device 38), to associate different portions of the light signal with each of the respective nodes 34 that are connected to that light sensitive device 38. Alternatively, or in addition, the time of flight may include the time elapsed between when the light is emitted from the node 34 and when the scattered light is received back at the node 34. In such embodiments, the time of flight provides information regarding the distance of the object or particle relative to the node 34.

In an embodiment, illustrated in the cross-section of the fiber optic cable shown in FIG. 3, two substantially identical and parallel light transmission fiber cores 40, 42 are included in the fiber optic cable 28 and terminate at the node 34 (not shown in FIG. 3). However, it should be understood that embodiments are also contemplated herein where the fiber optic cable 28 includes only a single fiber core, or more than two cores. In an embodiment, the light source 36 is coupled to the first fiber core 40 and the light sensitive device 38 is coupled to the second fiber core 42, for example near a first end of the fiber optic cable 28. The light source 36 is selectively operable to emit light, which travels down the first fiber core 40 of the fiber optic cable 28 to the node 34. At the node 34, the emitted light is expelled into the adjacent atmosphere. The light is scattered and transmitted back into the node 34 and down the fiber cable 28 to the light sensitive device 38 via the second fiber core 42.

Figure 4A:
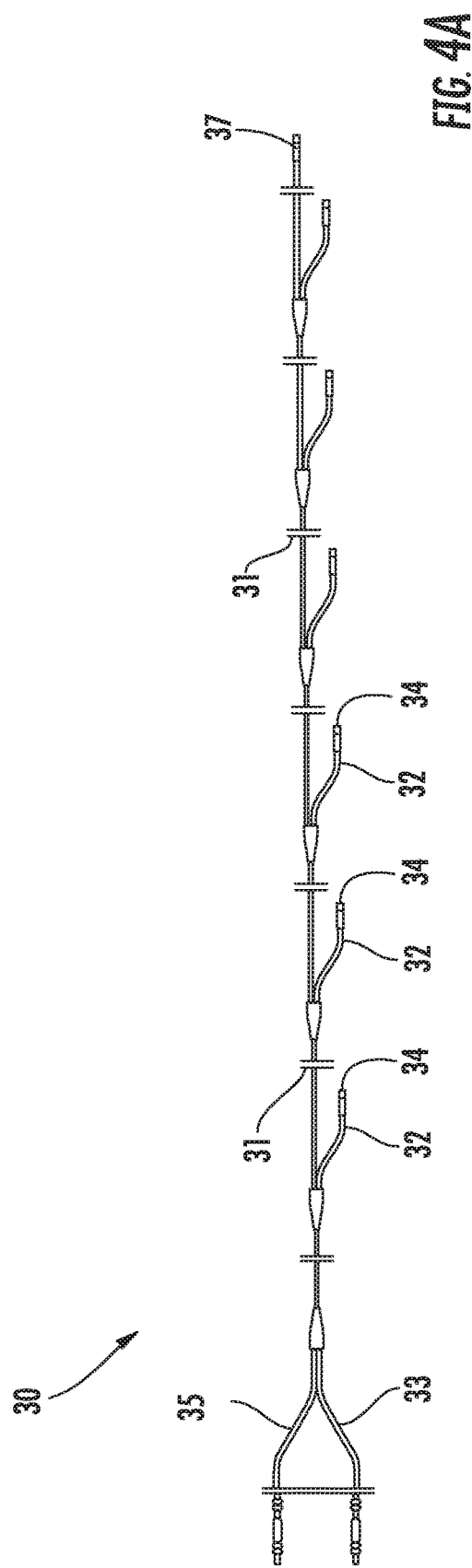
FIG. 4A is a side view of a fiber harness of a detection system according to an embodiment.
Figure 4B:
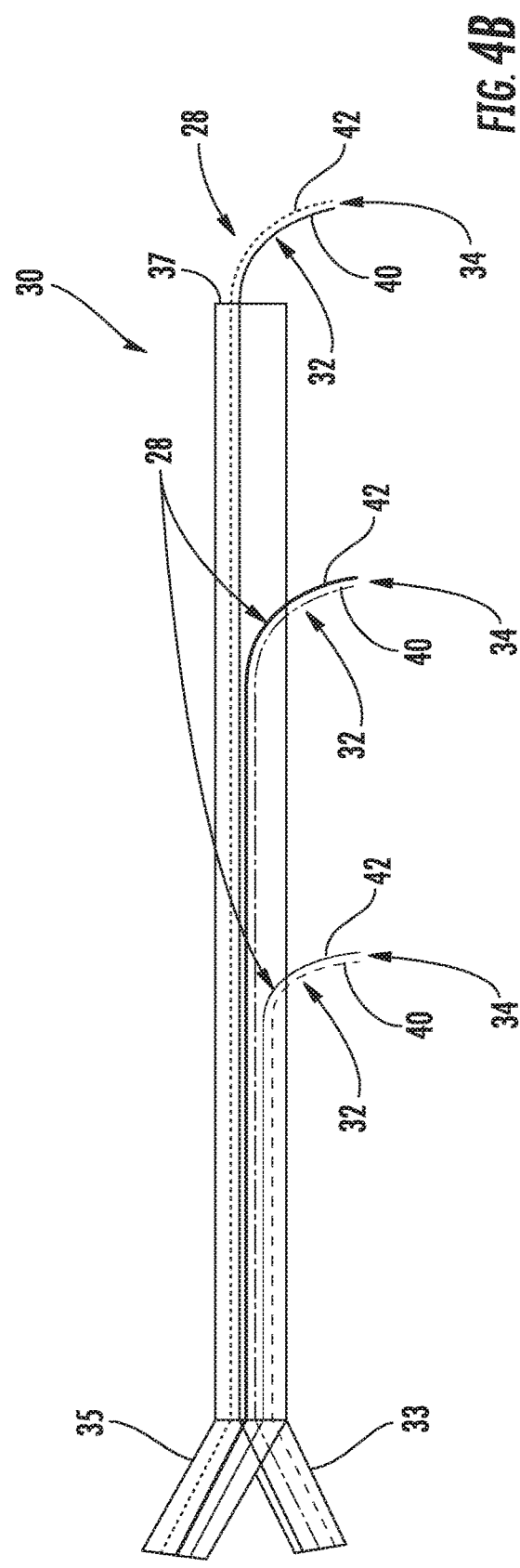
FIG. 4B is a schematic diagram of a fiber harness of a detection system according to an embodiment.

In more complex embodiments, as shown in FIGS. 4A and 4B, rather than having a plurality of individual fiber optic cables 28 separately coupled to the control unit 50, the detection system 20 includes a fiber harness 30. The fiber harness 30 may be formed by bundling a plurality of fiber optic cables 28, or the cores associated with a plurality of fiber optic cables 28, together within a single conduit or sheath for example. However, it should be understood that embodiments where the fiber harness 30 includes only a single fiber optic cable 28 or the cores associated therewith are also contemplated herein.

Structural rigidity is provided to the fiber harness 30 via the inclusion of one or more fiber harness backbones 31. As shown in the FIG., in embodiments where the fiber harness 30 includes a plurality of fiber optic cables 28, the plurality of cables 28 may be bundled together at one or more locations, upstream from the end of each cable 28. The end of each fiber optic cable 28, and therefore the end of each core associated with the cable 28, is separated from the remainder of the fiber optic cables 28 at an adjacent, downstream backbone 31 formed along the length of the fiber harness 30. Each of these free ends defines a fiber optic branch 32 of the fiber harness 30 and has a node 34 associated therewith. For example, as best shown in FIG. 4B, each fiber optic branch 32 includes the free ends of cores 40, 42 that define a node 34 of a corresponding fiber optic cable 28.

In the illustrated, non-limiting embodiments of FIGS. 4A and 4B, the fiber harness 30 additionally includes an emitter leg 33 and a receiver leg 35 associated with each of the plurality of fiber optic branches 32. The emitter leg 33 may contain the first fiber optic cores 40 from each of the plurality of fiber optic branches 32 and the receiver leg 35 may contain all of the second fiber cores 42 from each of the fiber optic branches 32. The length of each pair of fiber optic cores 40, 42 extending between the emitter leg 33 or the receiver leg 35 and a node 34 may vary in length. As a result, each node 34, defined by the cores 40, 42 at the end of each fiber optic branch 32, may be arranged at a distinct location along the fiber harness 30. Accordingly, the position of each of the nodes 34 relative to the fiber harness 30 may be controlled by the length of the cores 40, 42 associated with each node 34. The position of each of the nodes 34 may be set during manufacture, or at the time of installation of the system 20. With this variation in length and therefore position of each node 34, only the longest core or pair of cores 40, 42 is supported at the final backbone 31 located upstream from the end 37 of the harness 30.

Alternatively, the fiber harness 30 may include a fiber optic cable (not shown) having a plurality of branches 32 integrally formed therewith and extending therefrom. The branches 32 may include only a single fiber optic core. The configuration, specifically the spacing of the nodes 34 within a fiber harness 30 may be arranged at locations substantially equidistant from one another. Alternatively, the distance between a first node and a second node may be distinct than the distance between the second node and a third node. In an embodiment, the positioning of each node 34 may correlate to a specific location within the designated area. It is understood that there is no minimum spacing required between adjacent nodes 34.

Figure 5:
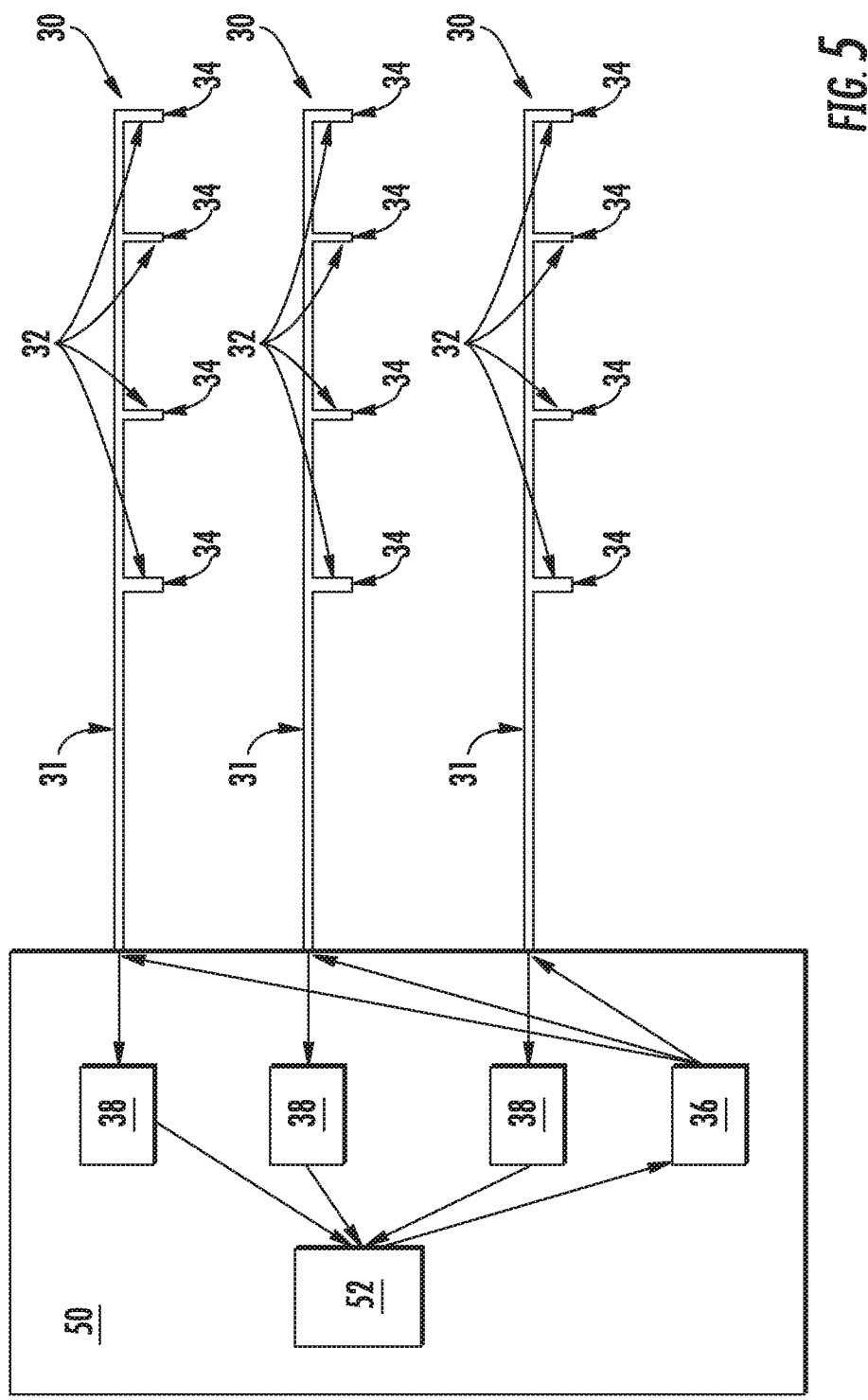
FIG. 5 is a schematic diagram of a detection system including a plurality of fiber harnesses according to an embodiment.

With reference now to FIG. 5, the detection system 20 may additionally include a plurality of fiber harnesses 30. In the illustrated, non-limiting embodiment, a distinct light sensitive device 38 is associated with each of the plurality of fiber harnesses 30, and more specifically with each of the plurality of light transmission cores 42 within the harnesses 30. However, embodiments where a single light sensitive device 38 is coupled to the plurality of fiber harnesses 30 are also contemplated here. In addition, a single light source 36 may be operably coupled to the plurality of light transmission fiber cores 40 within the plurality of fiber harnesses 30 of the system 20. Alternatively, the detection system 20 may include a plurality of light sources 36, each of which is coupled to one or more of the plurality of fiber harnesses 30.

Figure 6:
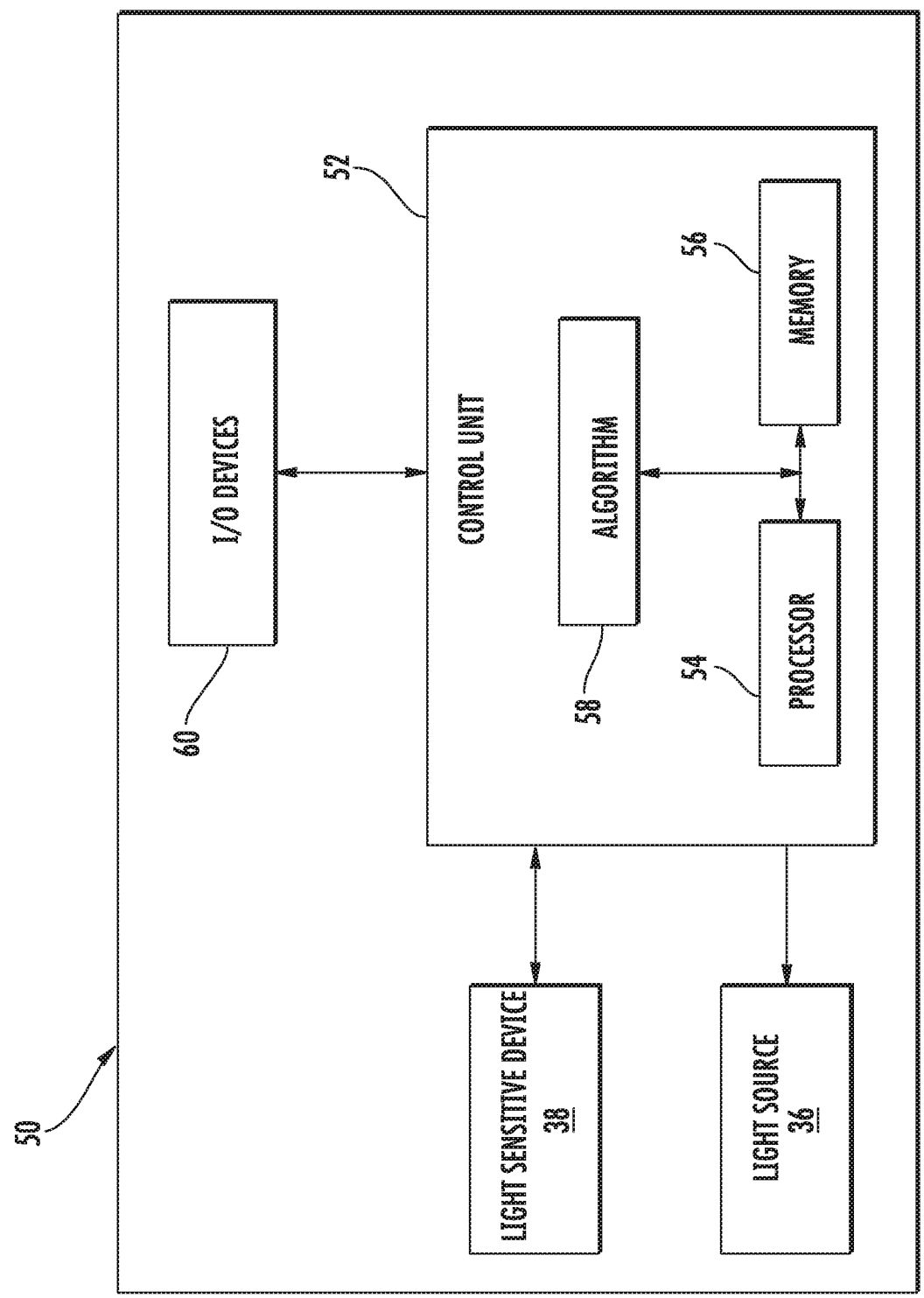
FIG. 6 is a perspective view of an area within a building to be monitored by a detection system according to an embodiment.

The control system 50 of the detection system 20 is utilized to manage the detection system operation and may include control of components, data acquisition, data processing and data analysis. The control system 50, illustrated in FIG. 6, includes at least one light sensitive device 38, at least one light source, 36, and a control unit 52, such as a computer having one or more processors 54 and memory 56 for implementing one or more algorithms 58 as executable instructions that are executed by the processor 54. The instructions may be stored or organized in any manner at any level of abstraction. The processor 54 may be any type of processor, including a central processing unit ("CPU"), a general purpose processor, a digital signal processor, a microcontroller, an application specific integrated circuit ("ASIC"), a field programmable gate array ("FPGA"), or the like. Also, in some embodiments, memory 56 may include random access memory ("RAM"), read only memory ("ROM"), or other electronic, optical, magnetic, or any other computer readable medium for storing and supporting processing in the memory 56. In addition to being operably coupled to the at least one light source 36 and the at least one light sensitive device 38, the control unit 52 may be associated with one or more input/output devices 60. In an embodiment, the input/output devices 60 may include an alarm or other signal, or a tire suppression system which are activated upon detection of a predefined event or condition. It should be understood herein that the term alarm, as used herein, may indicate any of the possible outcomes of a detection.

The control unit 52, and in some embodiments, the processor 54, may be coupled to the at least one light source 36 and the at least one light sensitive device 38 via connectors. The light sensitive device 38 is configured to convert the scattered light received from a node 34 into a corresponding signal receivable by the processor 54. In an embodiment, the signal generated by the light sensing device 38 is an electronic signal. The signal output from the light sensing device 38 is then provided to the control unit 52 for processing via the processor 54 using an algorithm 58 to determine whether a predefined condition is present.

The signal received by or outputted from the light sensitive device(s) 38 may be amplified and/or filtered, such as by a comparator (not shown), to reduce or eliminate irrelevant information within the signal prior to being communicated to the control unit 52 located remotely from the node 34. In such embodiments, the amplification and filtering of the signal may occur directly within the light sensing device 38, or alternatively, may occur via one or more components disposed between the light sensing device 38 and the control unit 52. The control unit 52 may control the data acquisition of the light sensitive device 38, such as by adjusting the gain of the amplifier, the bandwidth of filters, sampling rates, the amount of timing and data buffering for example.

Figure 7:
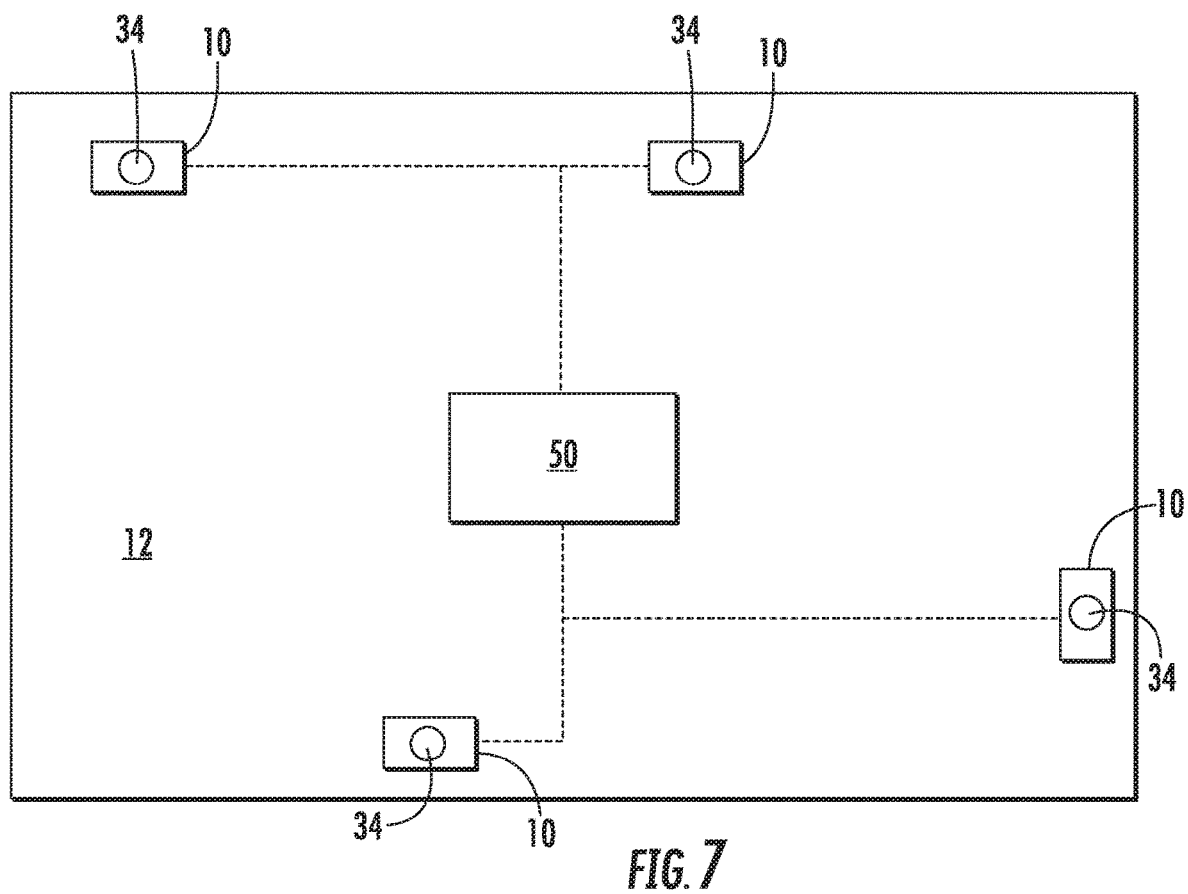
FIG. 7 is a schematic diagram of the detection system according to an embodiment.

With reference now to FIG. 7, the detection system 20 may be configured to monitor one or more detection devices, illustrated schematically at 10, of a monitoring and alarm system arranged within a predetermined area, such as a building 12 for example. The plurality of detection devices 10 may be the same, or alternatively, may be different. Typically each detection device will be monitored by a distinct node 34 of a fiber harness 31 or cable 28. In an embodiment, the device 10 being monitored by the system 20 is a device typically associated with a fire detection system of a building or facility, such as a pull station or a fire detector for example.

Figure 8B:
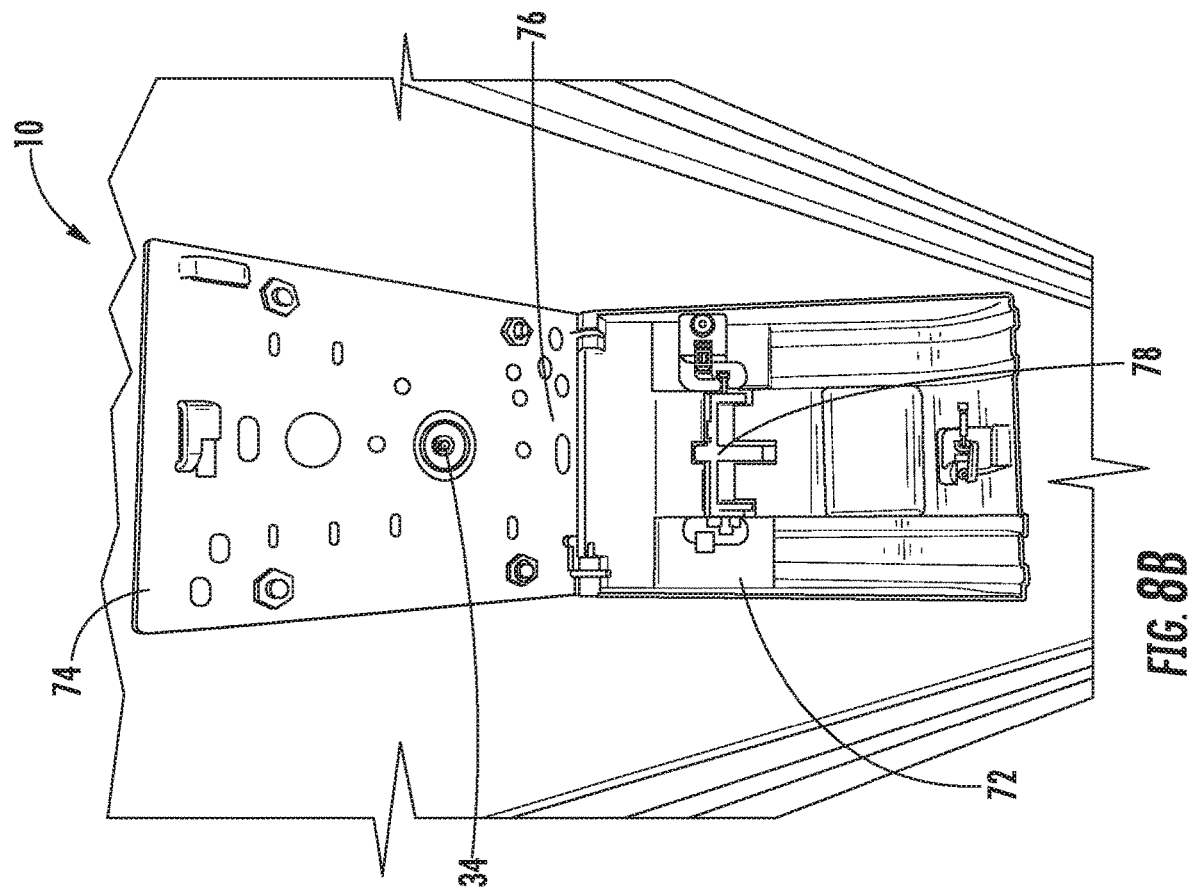
FIG. 8B is a perspective view of an interior of a detection device according to an embodiment.
Figure 8A:
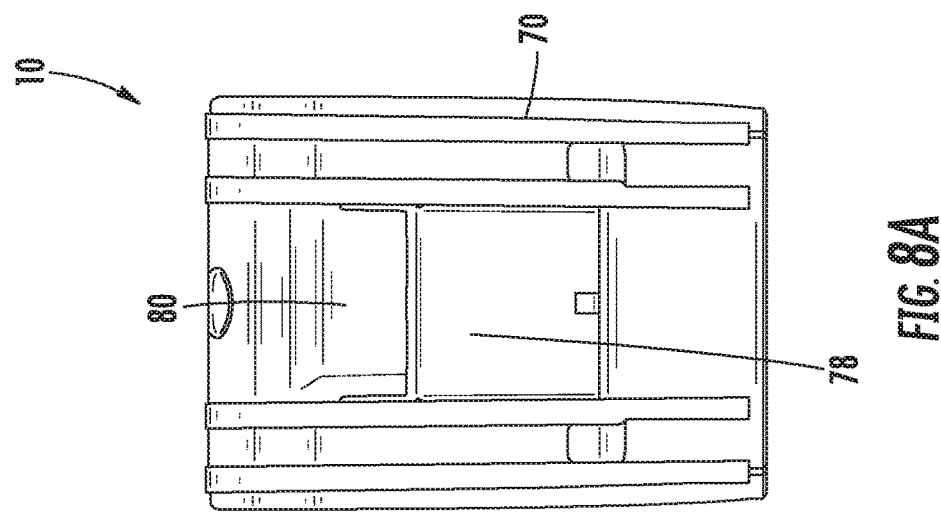
FIG. 8A is a perspective view of a detection device according to an embodiment.

With reference to the non-limiting embodiment of FIGS. 8A and 8B, an example of a detection device 10 suitable for use with the system 20 for example is provided in more detail. In the illustrated embodiment, the detection device 10 is a pull station. However, it should be understood that any suitable device, such as a heat sensor, a sprinkler heat, a releasing panel, a notification device, or any other device in communication with a central fiber panel for example, is within the scope of the disclosure. As shown, the pull station 10 includes a housing 70, such as formed from a metal or plastic material. In an embodiment, the housing 70 is formed form a highly visible color such as red, yellow or orange for example. The housing 70 may be substantially rectangular in shape and includes a first portion 72 pivotally coupled to a second portion 74 with an interior chamber 76 defined there between. The second portion 74 may be mounted to a wall or other surface, and the first portion 72 is exposed to a surrounding environment. However, it should be understood that a housing 70 having any suitable shape or configuration accessible and/or recognizable by a user is contemplated herein.

The housing 70 additionally includes an alarm activation mechanism 78. In the illustrated, non-limiting embodiment, the alarm activation mechanism 78 includes a handle arranged within a recess 80 formed in the front of the first portion 72 of the housing 70. In other embodiments, the alarm activation mechanism 78 may include a switch, toggle, or push button extending from or formed integrally in an outer surface of the housing 70. The alarm activation mechanism 78 is manually movable or transformable between a first, default position or configuration, and a second, actuated position or configuration, to indicate the presence of an event, such as a fire for example.

In an embodiment, a portion of the alarm activation mechanism 78 is disposed within an interior of the housing 70, such as within the scattering chamber 76 defined between the first and second portions 72, 74 of the housing 70 for example. The geometry of the portion of the alarm activation mechanism 78 accessible from within the chamber 76 is configured to vary between when the mechanism 78 is in the first position and the second position. A change in the geometry changes the intensity of scattered light at the node monitoring the geometry. A change in geometry results in a change in the light scattering intensity received by the node due to a change in the interior of the housing shape, surface roughness, absorption coefficient, transmissivity or reflectivity.

The state or condition of the alarm activation mechanism 78 may be determined based on the light scattering that occurs within the chamber 76 of the housing 70. As best shown in FIG. 8B, a node of the detection system 20 may be formed in a portion of the housing 70 such that light is emitted from the node 34 into the chamber 76 of the housing 70. The pulse of light transmitted to the chamber 76 scatters within the chamber 76 and the light reflected back to the node 34 is then used to analyze the status of the pull station. The level of scattering that occurs will depend on the position of the alarm activation mechanism 78. For example, a first level of scattering in response to the geometry of the alarm activation mechanism 78 when in the first position and a second level of scattering will occur based on the geometry of the alarm activation mechanism 78 when in the second position. The first level of scattering and the second level of scattering are distinct. Accordingly, the difference in the scattered light reflected back to the node 34 from the chamber 76 is used to determine the position of the alarm activation mechanism 78, and therefore whether the device 10 has been actuated. The scattered light reflected back to the node 34 and provided to the light sensitive device 38 may be converted into a binary signal at the control unit 52.

The state or condition of the alarm activation may be visually indicated to the persons in the area of the sensor or initiating device. In an embodiment, a visible light is transmitted through one of the optical cores and propagated to air at the point where the activation or detection happens. This transmission of visible light may not occur during standby conditions, and may be initiated to indicate that alarm activation mechanism 78 has been activated. Active visual indication can be by means of continuous, intermittent of fluctuating light intensity. Although the condition of the alarm activation mechanism 78 is illustrated and described herein via a visual indicator, in other embodiments, another type of indicator, such as an audible indicator for example, may be initiated upon determining that the alarm activation mechanism 78 is active.

Figure 9:
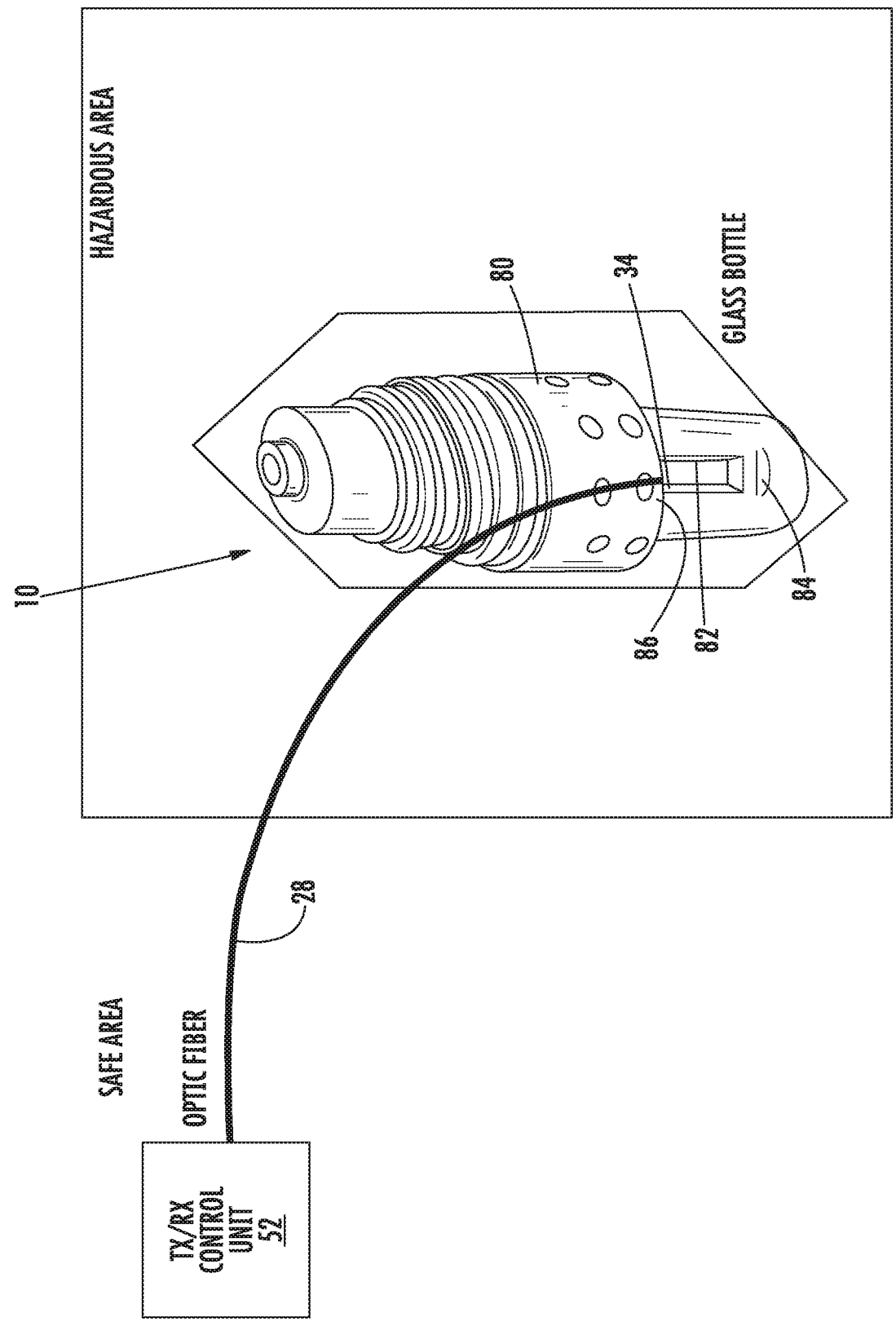
FIG. 9 is a perspective view of another detection device according to an embodiment.

In another embodiment, illustrated in FIG. 9, the detection device 10 is a heat detector or sprinkler device, such as for mounting to a ceiling within the building 12 for example. As shown, the device 10 includes a body 80 and an activator bulb 82 or other heat responsive element, disposed vertically between a first end 84 of the body 80 and an intermediate attachment point 86. However, it should be understood that in other embodiments, the activator bulb 82 may be arranged in a horizontal configuration. In some embodiments (not shown), the activator bulb may be separate from a sprinkler device When experiencing an elevated temperature, such as in the presence of a fire for example, a fluid contained within the activator bulb 82 expands, causing the bulb 82 to break. In embodiments where the detection device 10 is a sprinkler, the destruction of the bulb 82 will activate the sprinkler to supply a fire extinguishing agent in a known manner. Other heat responsive elements include, but are not limited to, bimetal parts or polymers with heat-induced contraction properties.

Similar to the pull station, a state or operational condition of the heat detection device 10 may be determined based on the light scattering that occurs as a result of a change of status of the activator bulb 82. A node 34 of the detection system 20 may be formed generally adjacent the heat detector 10 such that light is emitted from the node 34 toward the activator bulb 82. As the pulse of emitted light contacts the detection device 10, and specifically the activator bulb 82, the light scatters, and the light reflected back to the node 34 is then used to analyze the status of the detection device 10. If the activator bulb 82 is in a first configuration, such as when a temperature surrounding the heat detector 10 is normal (i.e. the bulb is whole), a first level of scattering will occur based on the geometry of the activator bulb 82 in the first configuration. When the activator bulb 82 is in a second configuration, such as due to expansion of the gas contained within the bulb 82 resulting from an elevated temperature surrounding the heat detector (i.e. the bulb is broken), a second level of scattering will occur based on the geometry of the bulb 82 in the second configuration. Accordingly, the difference in the scattered light reflected back to the node 34 is used to determine the configuration of the activator bulb 82, and therefore a condition of the heat detector or sprinkler 10 containing the activator bulb 82.

Additional levels of light scattering may also be detected by the node 34 and used to determine other status of the activator bulb 82 and heat detector 10. In other exemplary embodiments, heat resulting from the presence of a fire may generate a change in the light reflected adjacent the node 34. In such embodiments, a Fiber Bragg Grating or a coating may be used at the node 34 to alter the reflectivity or change the scattering measured at the node 34 to further indicate a change in temperature at the node. In other embodiments, fluid contained within the activator bulb 82 may bubble but not break the bulb 82, but the bubbling may cause a change in the light scattering that is detectable by the node 34. In yet another embodiment, the node 34 may be used to determine whether a suppression agent is actively being released from a corresponding detection device 10. In such instances, the node 34 may only monitor the release of suppression agent, or alternatively, may indicate multiple changes in signal intensity firstly to indicate that the detection device has transitioned to a position indicating the presence of a fire and secondly to indicate that the suppression agent is being released from the detection device 10.

By utilizing optic signals to monitor a condition of a detection device 10 rather than electrical signals, the risk of electrical sparks is eliminated. In applications where the detection device 10 is located in an explosive environment, the limited optical power and the inexistence of galvanic electricity may be particularly beneficial in reducing the risk of an explosion. Further, the detection device 10 is able to operate under a broader range of conditions, including but not limited to high humidity environments, condensing environments, underwater, and in the presence of hydrocarbons.

Figure 10:
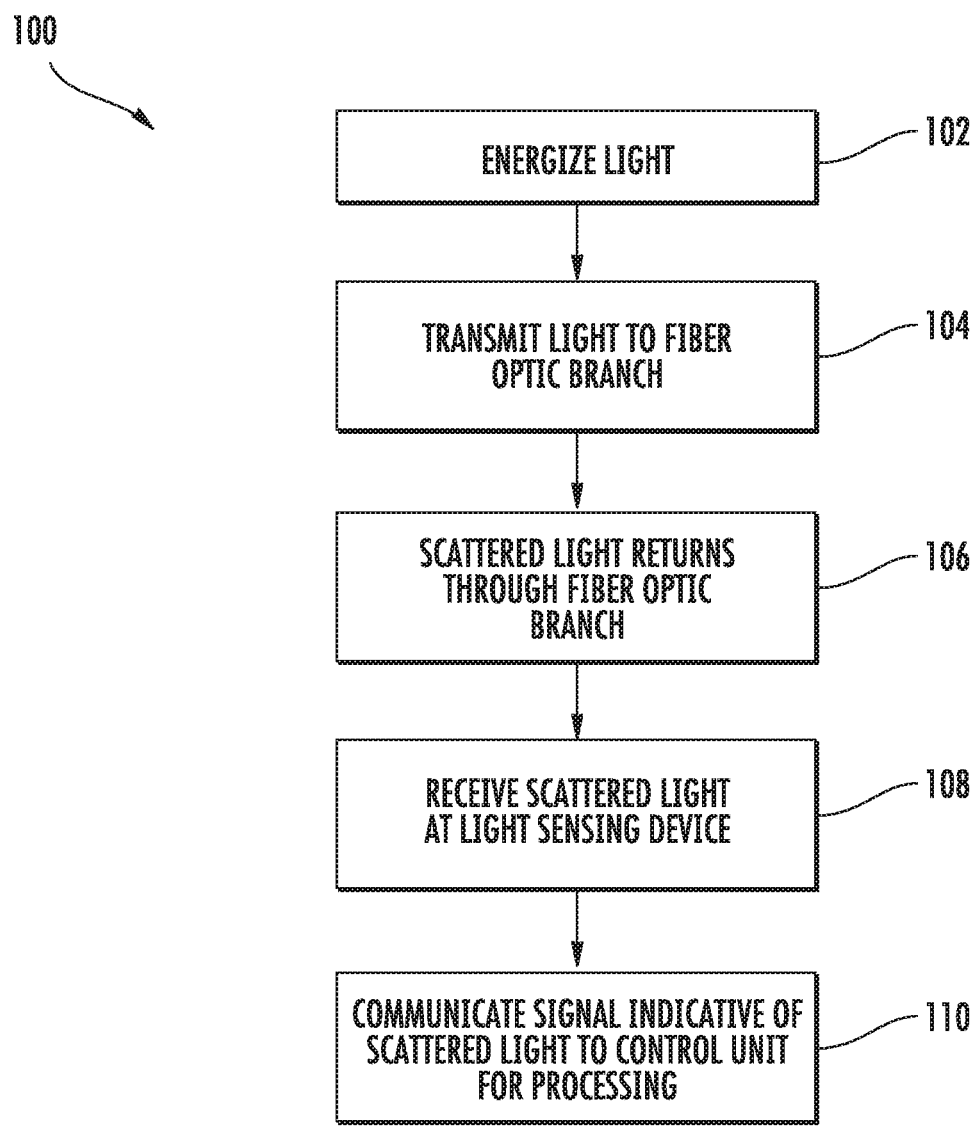
FIG. 10 is a method of operating a detection system according to an embodiment.

A method of operation 100 of the detection system 20 is illustrated in FIG. 10. The control unit 52 operably coupled to the light source 36 is configured to selectively energize the light source 36, as shown in block 102, and to emit light to a fiber harness 30, or alternatively to a fiber optic cable 28, coupled thereto as shown in block 104. Based on the desired operation of the detection system 20, the control unit 52 may vary the intensity, duration, repetition, frequency, or other properties, of the light emitted. As the light travels down the first fiber core 40 of the at least one fiber optic branch 32, all or a portion of the light is emitted at one or more nodes 34 of the fiber harness 30 to a portion of the detection device 10. In block 106, light is scattered based on a geometry of a component of the detection device and is transmitted back through the fiber optic branches 32 via the second fiber cores 42. The scattered light may include one or more of scattered light within the atmosphere adjacent the node 34 and scattered light that reflects from an interior of the fiber optic branch 32. The scattered light is transmitted to the at least one light sensing device 38 in block 108.

As shown in block 110, the light sensing device 38 generates a signal in response to the scattered light received by each node 34, and provides that signal to the control unit 52 for further processing to determine a specific condition of the detection device 10 associated with each node of the system 20. Using the algorithm 58 executed by the processor 54, each of the signals representing the scattered light received by the corresponding nodes 34 are evaluated to determine whether the light at the node 34 indicates a condition of a corresponding detection device 10. The signals communicated between the nodes 34 and the control unit 52 may further identify the location of each node 34 such that in the event that one or more of the detection devices 10 is determined to be in an active condition, the location of those active detection devices 10 is known by the control unit 52.

In an embodiment, the detection system 20 for monitoring a status or condition of one or more detection devices 10 may also be capable of detecting the presence of one or more known conditions within an area. In such embodiments, a portion of the nodes 34 of the system 20 may be used to monitor a condition of one or more detection devices 10 and another portion of the nodes 34 of the system 20 may be used to detect the presence of one or more particles, such as smoke particles for example, in the atmosphere adjacent the node 34. A fire detection system having one or more nodes configured to detect the presence of a condition is illustrated and described in International Patent Application Serial No. PCT/US17/60855, the entire contents of which are incorporated herein by reference.

Figure 11:
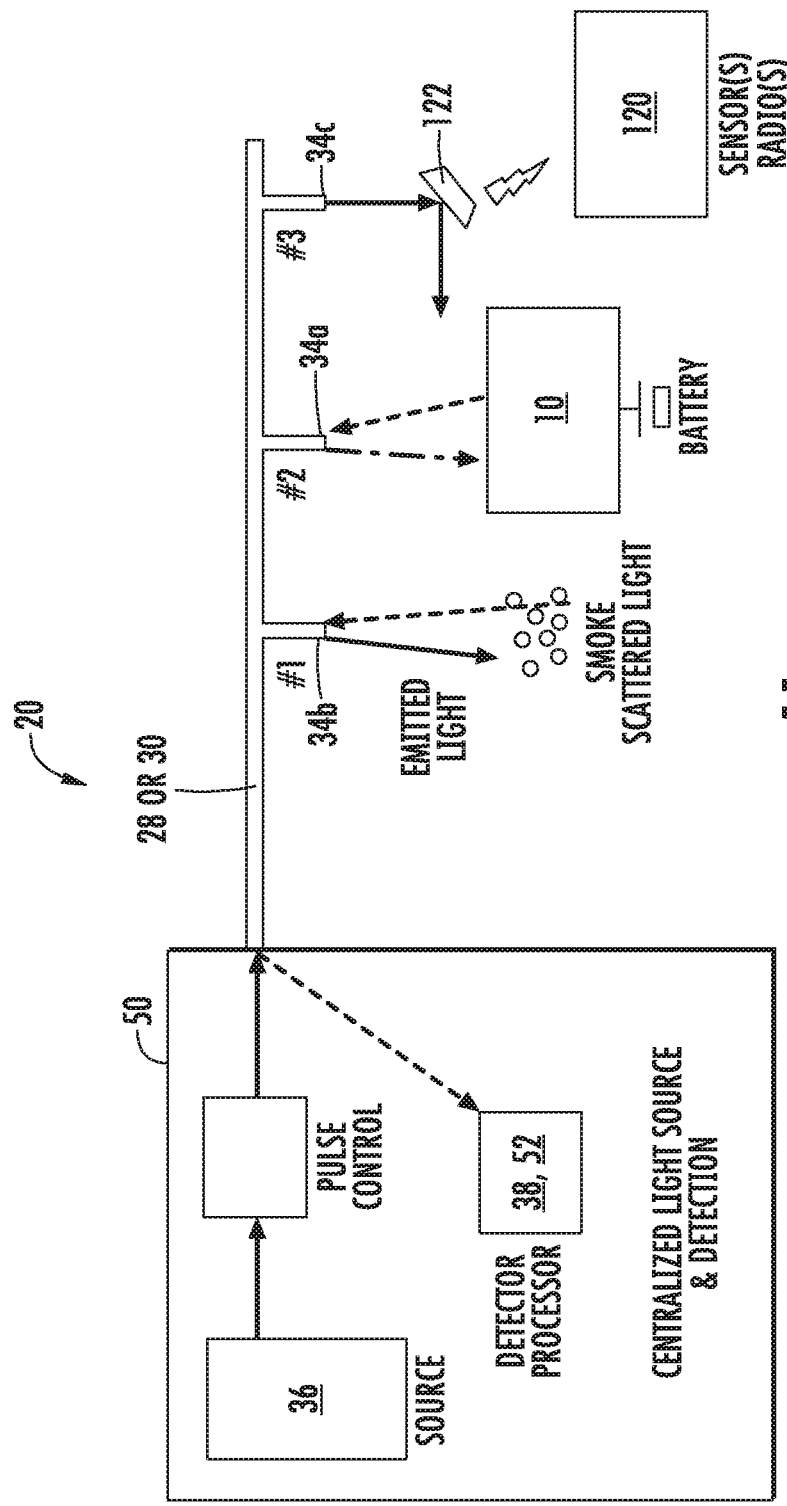
FIG. 11 is a schematic diagram of a detection system according to an embodiment.

The control system 50 of the detection system 20 may provide centralized detection each of the plurality of nodes 34 of the system 20. In such embodiments, the control system 50 may function in a manner similar to a central panel of conventional detection systems. With reference now to FIG. 11, an example of a detection system 20 includes not only nodes 34a associated with one or more detection devices 10, but also nodes 34b configured to detect the presence of one or more particles in an adjacent atmosphere. Further, the system 20 may additionally include one or more nodes 34c associated with additional devices, illustrated schematically at 120, such as alarms, indicators, sensors, cameras, and radios for example. Through the fiber optic network formed by the one or more fiber optic harnesses 30 or cables 28, each of the devices 10, 120 and areas associated with a node 34 is arranged in communication with the control system 50 of the detection system 20. Accordingly, through the fiber optic network, a status of each of the devices 10, 120 is monitored by the control system 50.

The control system 50 is operable not only to perform detection at each of the nodes 34 of the system 20, but also to communicate with and distribute power to necessary components of the system 20, such as detection devices 10 or indicator devices 120 that require electricity. In an embodiment, this detection, communication, and delivery of power may occur simultaneously through the transmission of light. In an embodiment, pulses of light having different intensities and/or durations are used for communication, sensing, and energy conversion, respectively. For example, a short pulse followed by no light emission may be utilized for sensing and communication and reading of the returned scattered light. A long pulse with a high intensity emission may be used to power an energy conversion device. The different types of light emission would need to be properly scheduled, such as on a millisecond time-frame for example, to optimize both the sensing and communication and power conversion efficiencies.

To distribute power, energy conversion hardware capable of converting light energy into electrical energy, illustrated schematically at 122, such as a photovoltaic cell for example, must be located at or near a node 34 associated with the device 10, 120 requiring electrical energy. During operation, the light communicated to the node 34 is received by the energy conversion hardware 122 and is converted into electrical energy for distribution to the nearby device 10, 120. In some embodiments, the converted electrical energy may be used to charge a battery associated with the device 10, 120. Alternatively, or in addition, the conversion device 122 may be configured to convert a light signal into a radio wave for communication with a radio or other device.

A detection system 20 as described herein may form a hybrid building network including both optical and electronic components. Further, it should be understood that the detection system 20 is not limited to applications associated with the detection of a hazardous condition, such as a fire for example. The detection system 20 allows for incorporation of several building and facility management systems, such as smoke and fire detection, environmental sensing and control, security sensing, message broadcasting, and wireless communications for example, into a single platform.

Such a system reduces not only installation but also maintenance costs compared to conventional building operations.

While the disclosure has been described in detail in connection with only a limited number of embodiments, it should be readily understood that the disclosure is not limited to such disclosed embodiments. Rather, the invention can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A system for measuring a status of a detection device, comprising:
the detection device comprising a component transformable between a plurality of configurations;
a fiber optic cable for transmitting light, the at least one fiber optic cable defining a node arranged in communication with the component; and
a control system operably coupled to the fiber optic cable such that scattered light reflected from the component and returned to the node is transmitted to the control system, wherein the control system analyzes the scattered light to determine the configuration of the component.

2. The system of claim 1, wherein the component is manually transformable between the plurality of configurations.

3. The system of claim 1, wherein the component is automatically transformable between the plurality of configurations in response to an external condition.

4. The system of claim 1, wherein the node is arranged in communication with a chamber formed at an interior of the detection device.

5. The system of claim 1, wherein the plurality of configurations comprise at least a first configuration and a second configuration, the component being in the first configuration during normal operation of the detection device and the component being in the second configuration when the detection device is activated.

6. The system of claim 5, wherein the detection device is a pull station.

7. The system of claim 6, wherein the component of the detection device is an alarm activation mechanism.

8. The system of claim 5, wherein the detection device comprises a heat responsive mechanism.

9. The system of claim 8, wherein the heat responsive mechanism is a sprinkler.

10. The system of claim 8, wherein the component of the heat responsive mechanism is an activator bulb.

11. The system of claim 10, wherein the activator bulb is whole in the first configuration and is broken in the second configuration.

12. The system of claim 10, wherein a fluid contained within the activator bulb is in a first state in the first configuration and is in a second state in the second configuration.

13. The system of claim 12, wherein in the first state the fluid is a liquid, and in the second state the fluid is a bubbling or at least partially vaporized.

14. A method for determining a status of a detection device comprising:
transmitting light along a fiber optic cable to a node arranged in communication with a component of the detection device;
receiving scattered light reflected from the component;
communicating the scattered light to a control system; and
analyzing the scattered light to determine a configuration of the component.

15. The method of claim 14, wherein the detection component is transformable between a first configuration and a second configuration and analyzing the scattered light determined whether the component is in the first configuration or the second configuration.

16. The method of claim 14, wherein transmitting light along a fiber optic cable to a node arranged in communication with a component of the detection device comprises transmitting light into a chamber of the detection device within which the component is at least partially received.

17. The method of claim 14, wherein transmitting light along a fiber optic cable to a node arranged in communication with a component of the detection device.

18. The method according to claim 14, further comprising converting the scattered light into a binary signal before communicating the electronic signal to a control unit of the control system.

* * * * *